(12) United States Patent
Rouquette et al.

(10) Patent No.: US 7,084,785 B2
(45) Date of Patent: Aug. 1, 2006

(54) METHOD AND DEVICE FOR DETERMINING A FINAL APPROACH PATH OF AN AIRCRAFT FOR A NON-PRECISION APPROACH FOR THE PURPOSE OF LANDING THE AIRCRAFT

(75) Inventors: Patrice Rouquette, La Loubiere (FR); Olivier Coussat, Caluire (FR)

(73) Assignee: Airbus France, Toulouse (FR)

( * ) Notice: Subject to any disclaimer, the term of this patent is extended or adjusted under 35 U.S.C. 154(b) by 288 days.

(21) Appl. No.: 10/775,230

(22) Filed: Feb. 11, 2004

(65) Prior Publication Data
US 2004/0183698 A1    Sep. 23, 2004

(30) Foreign Application Priority Data
Mar. 19, 2003  (FR) .................................. 03 03334

(51) Int. Cl.
*G01C 21/20* (2006.01)
(52) U.S. Cl. ........................................ 340/972; 701/16
(58) Field of Classification Search ................ 340/947, 340/951–953, 976, 972; 342/33, 36, 46, 342/49; 701/14, 16–18, 120
See application file for complete search history.

(56) References Cited
U.S. PATENT DOCUMENTS

| 3,169,730 A | 2/1965 | Tribken et al. ............. 244/187 |
| 3,666,929 A | 5/1972 | Menn ............................ 701/16 |
| 4,040,005 A * | 8/1977 | Melvin ......................... 340/973 |
| 4,259,658 A * | 3/1981 | Basov et al. ................. 340/951 |
| 4,368,517 A * | 1/1983 | Lovering ...................... 701/16 |
| 5,739,770 A | 4/1998 | Liden .......................... 340/276 |
| 6,111,526 A * | 8/2000 | Aymeric et al. ............. 340/972 |
| 6,711,479 B1 * | 3/2004 | Staggs .......................... 701/16 |
| 6,856,864 B1 * | 2/2005 | Gibbs et al. .................... 701/3 |
| 6,871,124 B1 * | 3/2005 | McElreath .................... 701/16 |
| 6,980,892 B1 * | 12/2005 | Chen et al. ..................... 701/9 |

OTHER PUBLICATIONS

Preliminary Search Report dated Dec. 1, 2003.

* cited by examiner

*Primary Examiner*—Jeffery Hofsass
*Assistant Examiner*—Anne V. Lai
(74) *Attorney, Agent, or Firm*—Stevens, Davis, Miller & Mosher, LLP.

(57) ABSTRACT

The method provides for determining an approach mode which has been selected by the pilot of the aircraft from among a plurality of predetermined approach modes, for selecting a characteristic segment (6) of an arrival path which relates to the selected approach mode thus determined, for determining the orientation of the projection on the ground of the said characteristic segment (6) with respect to the center line of the said runway (5) and, depending on this orientation, for determining an anchoring point of the said final approach path, the orientation ($\alpha$) in a horizontal plane of the said final approach path and the slope ($\beta$) of the said final approach path.

21 Claims, 4 Drawing Sheets

METHOD AND DEVICE FOR DETERMINING A FINAL APPROACH PATH OF AN AIRCRAFT FOR A NON-PRECISION APPROACH FOR THE PURPOSE OF LANDING THE AIRCRAFT

FIELD OF THE INVENTION

The present invention relates to a method and a device for determining a final approach path of an aircraft for a non-precision approach, for the purpose of landing the aircraft on a runway.

BACKGROUND OF THE RELATED ART

In the context of the present invention, the term "non-precision approach" is understood to be an approach which is not a precision instrument approach, such as for example an ILS (Instrument Landing System) approach. It is known that, in order to use a precision instrument approach, ground stations are used, which are located at the edge of the runway, and at least one special radio receiver installed in the aircraft, which provides horizontal and vertical guidance before and during the landing by showing the pilot the lateral deviation with respect to an approach line and the vertical deviation with respect to a descent plan. Such a precision instrument approach provides great and effective assistance in landing (by lateral guidance and vertical guidance), in particular in poor visibility (fog, etc) or when there is no visibility.

A non-precision approach, such as considered in the present invention, therefore exists when the preceding items of information are totally or partially unavailable, such that a normal precision approach cannot be used.

In order to use a non-precision approach, it is necessary to determine a virtual path, corresponding to the theoretical path that the aircraft must follow during this approach. The guidance of the aircraft then consists in trying to cancel the possible deviations between the actual position of the aircraft and the position that it would have if it were on this virtual path.

The accuracy of the latter is of course essential, at least in the immediate proximity of the runway, for the success of the landing in total safety.

SUMMARY OF THE INVENTION

The purpose of the present invention is to determine the last section of such a virtual path. More precisely, it relates to a method for determining a final approach path of an aircraft for a non-precision approach, for the purpose of landing the aircraft on a runway.

According to the invention, the method is noteworthy in that:
a) there is determined an approach mode which has been selected by the pilot of the aircraft from among a plurality of predetermined approach modes;
b) there is selected a characteristic segment of an arrival path which relates to the selected approach mode thus determined;
c) the orientation of the projection on the ground of the said characteristic segment is determined with respect to the center line of the said runway; and
d) depending on this orientation, there is determined:
   an anchoring point of the said final approach path;
   the orientation in a horizontal plane of the said final approach path; and
   the slope of the said final approach path.
Furthermore, according to the invention, in step d) there is determined:

as the orientation of the said final approach path, the orientation of the said characteristic segment; and
as the slope of the said final approach path, the slope of the said characteristic segment.

Furthermore, advantageously, when the projection on the ground of the said characteristic segment is aligned with the center line of the runway, the following operations are carried out in step d):
d1) there is determined a characteristic point corresponding to the limit point at which the pilot must overshoot when the approach is aborted;
d2) there is determined the relative position between the projection on the ground of the said characteristic point and the threshold of the runway; and
d3) the said anchoring point of the said final approach path is determined according to this relative position.

In this case, when the projection on the ground of the characteristic point is located on or downstream of the threshold of the runway with respect to the direction of approach of the aircraft, in step d3) there is determined, as an anchoring point of the said final approach path, the point of intersection between the said characteristic segment and a horizontal plane located at a predetermined altitude.

However, when the projection on the ground of the characteristic point is located upstream of the threshold of the runway with respect to the direction of approach of the aircraft, in step d3) there is determined, as an anchoring point of the said final approach path, the point of intersection of the extension toward the ground of the said characteristic segment and a horizontal plane located at a predetermined altitude.

The case in which the projection on the ground of the said characteristic segment is not aligned with the center line of the runway is now considered.

In this case, firstly in a first particular embodiment, in order to determine, in step d), the said anchoring point of the said final approach path:
   there is determined a reference point from which the pilot is considered to initiate a rotation of the aircraft in order to join a vertical plane containing the center line of the runway, according to a reference path;
   the said reference path is determined;
   there is determined a horizontal straight line which is located in a horizontal plane which is at a predetermined altitude and which is partially merged with the vertical projection on the said horizontal plane of the said characteristic segment; and
   there is determined, as an anchoring point, the point which is such that:
      on the one hand, the vertical projection of the final approach path on the said horizontal plane is partially merged with the said horizontal straight line; and
      on the other hand, the distance between the said point and the reference point along the final approach path is substantially equal to the distance between the said reference point and the threshold of the runway along the said reference path.

Secondly, in a second particular embodiment, in order to determine, in step d), the said anchoring point of the said final approach path:
   there is determined a reference point from which the pilot is considered to initiate a rotation of the aircraft in order to join a vertical plane containing the center line of the runway, according to a reference path;
   the said reference path is determined; and there is determined, as an anchoring point, the point
which is such that the distance between the latter and
the vertical projection of the said reference point on a
horizontal plane located at a predetermined altitude is
substantially equal to the distance between the vertical
projections on the said horizontal plane of the said
reference point and of the threshold of the runway,
along the vertical projection of the said reference path
on the said horizontal plane.

Furthermore, thirdly, in a variant embodiment, in order to determine, in step d), the said anchoring point of the said final approach path:

there is determined a reference point from which the pilot
is considered to initiate a rotation of the aircraft in order
to join a vertical plane containing the center line of the
runway, according to a reference path; and there is determined, as an anchoring point, the point
which is such that the distance between the latter and
the said reference point is substantially equal to the
distance between the said reference point and the
threshold of the runway.

Furthermore, fourthly, in a preferred embodiment, in order to determine, in step d), the said anchoring point of the said final approach path:

there is determined a horizontal straight line which is
located in a horizontal plane which is at a predetermined
altitude and which is partially merged with the
vertical projection on the said horizontal plane of the
said characteristic segment;

there is determined an intermediate point which corresponds
to the intersection between the said horizontal
straight line and the vertical projection on the said
horizontal plane of the center line of the runway;

there is determined a circle having the said intermediate
point as its center and the distance between this intermediate
point and the vertical projection on the said
horizontal plane of the threshold of the runway as its
radius; and there is determined, as an anchoring point, the intersection
between the said circle and the said horizontal straight
line.

Fifthly, in a last particular embodiment:

in a first variant, in step d), there is used, as an anchoring
point of the said final approach path, a predetermined
final point, which is characteristic of the said approach
mode selected by the pilot of the aircraft; and in a second variant, in order to determine, in step d), the
said anchoring point of the said final approach path:

there is determined a predetermined final point, which
is characteristic of the said approach mode selected
by the pilot; and there is determined, as an anchoring point, the point
having:

as longitude and latitude, the longitude and latitude
of the said final point; and as altitude, a predetermined altitude.

The case in which the projection on the ground of the said characteristic segment is parallel with the center line of the runway, without being aligned with the latter, will now be considered.

In this case, firstly, in a particular embodiment, in order to determine, in step d), the said anchoring point of the said final approach path:

there is determined a reference point from which the pilot
is considered to initiate a rotation of the aircraft in order
to join a vertical plane containing the center line of the
runway, according to a reference path;

the said reference path is determined; and there is determined, as an anchoring point, the point
which is such that the distance between the latter and
the said reference point is substantially equal to the
distance, along the said reference path, between the
said reference point and the vertical projection of the
threshold of the runway on the said reference path.

Secondly, in a preferred embodiment, in order to determine, in step d), the said anchoring point of the said final approach path:

there is determined a reference point from which the pilot
is considered to initiate a rotation of the aircraft in order
to join a vertical plane containing the center line of the
runway, according to a reference path;

there is determined a horizontal straight line which is
located in a horizontal plane which is at a predetermined
altitude and which is partially merged with the
vertical projection on the said horizontal plane of the
said characteristic segment;

there is determined a circle having the said reference point
as its center and the distance between this reference
point and the vertical projection on the said horizontal
plane of the threshold of the runway as its radius; and there is determined, as an anchoring point, the point of
intersection between the said circle and the said horizontal
straight line.

Furthermore, thirdly, in another embodiment, in order to determine, in step d), the said anchoring point of the said final approach path:

there is determined a horizontal straight line which is
located in a horizontal plane which is at a predetermined
altitude and which is partially merged with the
vertical projection on the said horizontal plane of the
said characteristic segment;

there is determined an intermediate point which corresponds
to the vertical projection on the said horizontal
plane of the threshold of the said runway; and there is determined, as an anchoring point, the point
corresponding to the orthogonal projection of the said
intermediate point on the said horizontal straight line.

In the context of the present invention, the said predetermined altitude corresponds:

to the altitude of the threshold of the runway; or to the altitude of the threshold of the runway, increased by
a predetermined value; or to the altitude of the ground at the location of the said
anchoring point.

Furthermore, with regard to the said characteristic segment:

in a simplified embodiment, the said characteristic segment
corresponds to the last segment of the said arrival
path (which is relative to the approach mode selected
by the pilot, as mentioned previously); and in another embodiment, the said characteristic segment
corresponds to the segment of the said arrival path,
which passes through an altitude MDA which is characteristic
of the approach mode selected by the pilot of
the aircraft. This allows the pilot to have a stabilized
path from the moment he passes through (in descent)
the said altitude MDA.

The present invention also relates to a device for implementing the aforementioned method.

BRIEF DESCRIPTION OF THE DRAWINGS

The figures of the appended drawing will give a good understanding of how the invention may be embodied. In these figures, identical references denote similar elements.

DETAILED DESCRIPTION OF THE INVENTION

Figure 1:
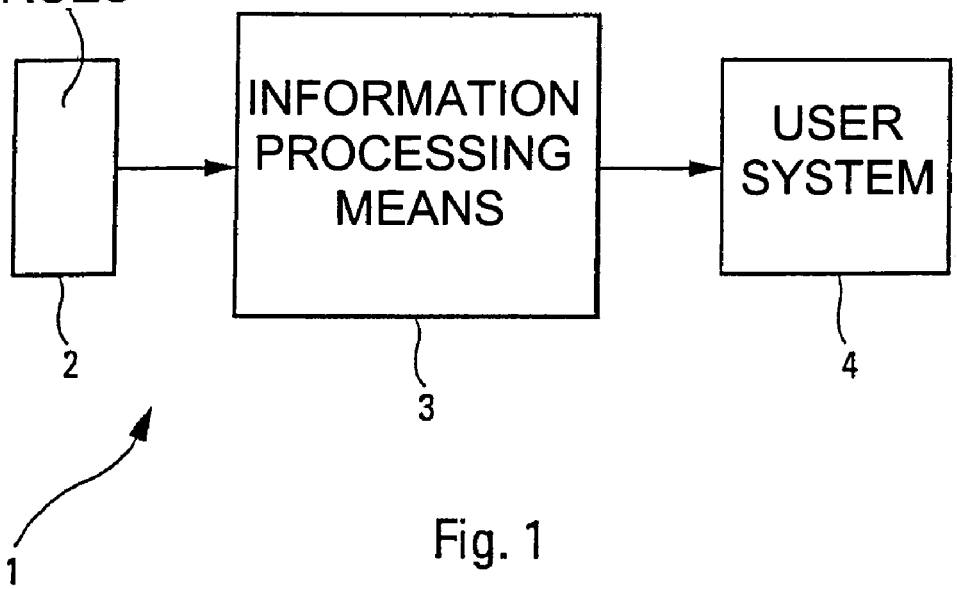
FIG. 1 is a block diagram of a device according to the invention.

The device 1 according to the invention and represented diagrammatically in FIG. 1 is installed in an aircraft, in particular a civil transport aircraft, and is intended for a non-precision approach for the purpose of landing the aircraft on a runway 5.

A non-precision approach can be implemented by the intermediary of one of a plurality of possible approach modes, which is selected by the pilot, and for which:
there is determined a virtual approach path, in particular on the basis of information contained in a database (not shown) installed in the aircraft; and
the lateral and vertical deviations of the position of the aircraft with respect to this virtual approach path are calculated.

The aircraft is then piloted in such a way as to cancel these deviations.

The purpose, in particular, of the device 1 is to determine the last part of this virtual approach path in the immediate proximity of the runway 5, this last part being called the final approach path Aa.

For this purpose, the device 1 comprises:
information sources 2 comprising, for example, at least a flight management computer, preferably of the FMS (Flight Management System) type; and
information processing means 3, for example a multi-mode landing assistance receiver of the MMR (Multi-Mode Receiver) type, that are connected to the said information sources 2 and which determine the said final approach path Aa.

The device 1 also comprises a user system 4, for example an automatic pilot of the aircraft, which uses the information supplied by the information processing means 3, in particular in order to guide the aircraft up until its landing on the runway 5.

Figure 2:
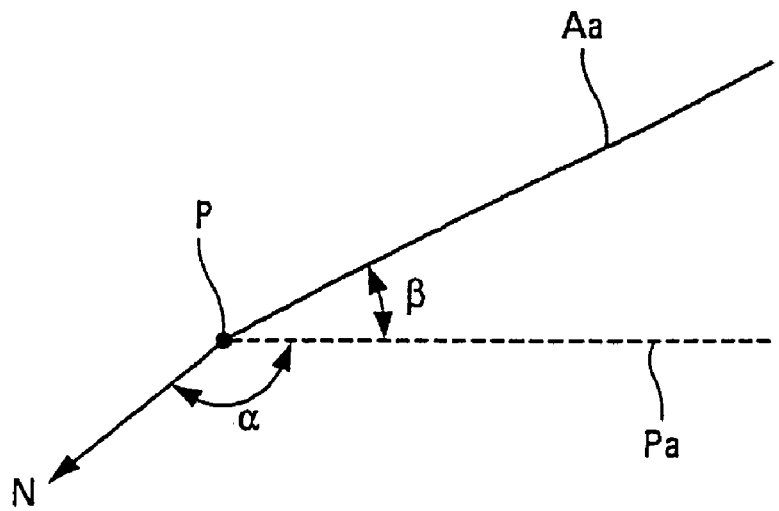
FIGS. 2 and 3 are two graphical representations making it possible to understand the subject of the present invention.

The said final approach path Aa is characterized by means of the following parameters (FIG. 2):
the position (latitude, longitude, altitude) of an anchoring point P of this (final) approach path Aa;
the orientation of this (final) approach path Aa, characterized by an angle $\alpha$, in a horizontal plane, between a predetermined direction N corresponding for example to North and the projection Pa of this approach path Aa on this horizontal plane; and
the slope of this approach path Aa, characterized by an angle $\beta$, in a vertical plane, between the said projection Pa of the approach path Aa on the horizontal plane and the said approach path Aa.

In a preferred embodiment of the invention, the altitude of the point P is equal to the altitude of the threshold S of the runway 5, increased by a predetermined value, preferably equal to a value "TCH" (Threshold Crossing Height) corresponding to the height at which the aircraft passes over the threshold S of the runway 5. This value "TCH" is generally published in the approach maps and encoded in a database (not shown) of the aircraft. It is often equal to 50 feet (about 15 meters). If no TCH height is published, the altitude of the point P can be chosen as equal to the altitude of the runway threshold S, increased by a predetermined value, preferably equal to 50 feet.

However, in a first variant embodiment of the invention, this altitude of the point P is equal to the altitude of the threshold S of the runway 5 and, in a second variant, it is equal to the altitude of the ground at the location (latitude, longitude) of the point P.

In the following description, the term "predetermined altitude" refers to the altitude obtained in any one of the preceding ways.

Figure 3:
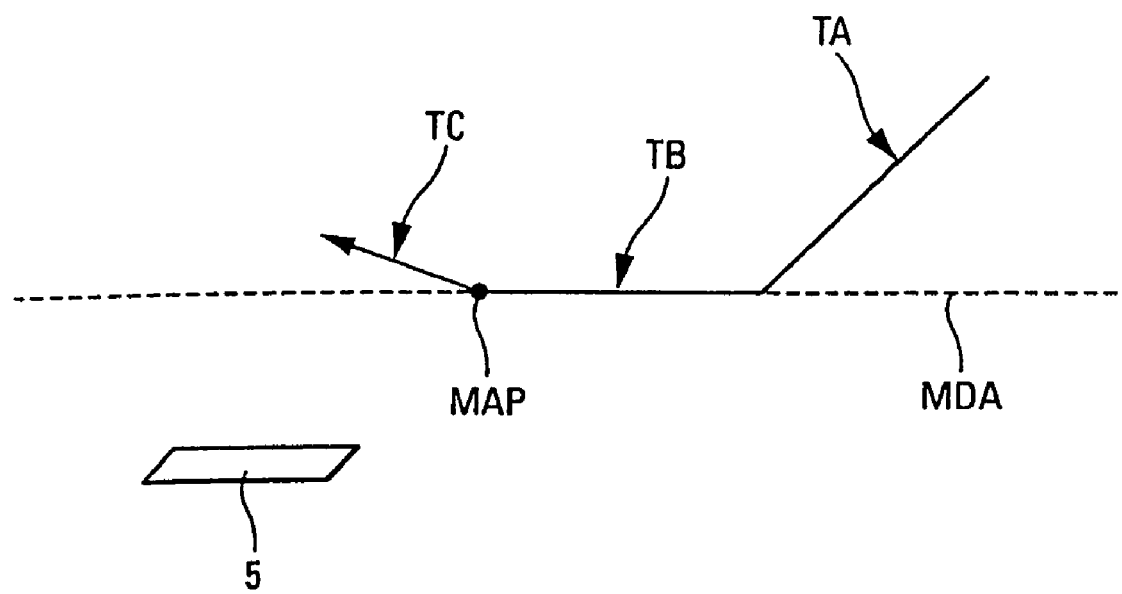

In order to determine the said (final) approach path Aa, the following known parameters are used, which are characteristics of the approach mode selected by the pilot in order to implement the non-precision approach and which are shown in FIG. 3:
a characteristic point MAP (Missed Approach Point), which is published and which corresponds to the limit point at which the pilot must overshoot at the latest when the corresponding approach is missed (which is particularly the case when he does not see the runway 5 before arriving at this point MAP). In general, the MAP point is the last point of the flight plan entered into the FMS flight management system of the aircraft; and
a characteristic altitude MDA (Minimum Descent Altitude) which is also published.

It is known that the usual way of piloting the approach, not included in the approach modes provided in the present invention, depends on the position of the point MAP and on the altitude MDA:
if the aircraft reaches the point MAP before reaching the altitude MDA, the pilot decides either to continue the approach if he has visual references, or to overshoot starting from the point MAP if he cannot see the runway 5;
if the aircraft reaches (during descent) the altitude MDA before reaching the point MAP (the path TA in FIG. 3), the pilot decides either to continue the approach if he has visual references, or to fly level at the altitude MDA (path TB) and, if he does not have visual references before reaching the point MAP, he overshoots when he arrives at the said point MAP (path TC).

It will be noted that the method that is the subject of the invention is advantageous in that it makes it possible to guide the aircraft up to the point P and therefore potentially until it reaches the ground on the basis of possible deviations between the actual position of the aircraft and the position that it has (or would have) if it is (were) on the approach path Aa, these deviations being determined by the said information processing means 3 or by the said user system 4.

In the context of the present invention, several ways are distinguished for determining the said approach path Aa according to the position of the point MAP with respect to the threshold S of the runway 5 and according to the orientation of a characteristic segment 6 of an arrival path (which is characteristic of the approach mode selected by the pilot), with respect to the center line Ap of the runway 5. In the following description, the last segment of the arrival path is taken as the characteristic segment 6.

A first situation is now considered in which the center line Ap of the runway 5 is aligned with the projection on the ground of the said last segment 6 of the arrival path.

Firstly, according to the invention, when the vertical projection on the ground of the point MAP corresponding to the approach mode selected by the pilot is located on or downstream of the runway threshold S with respect to the direction of approach E of the aircraft, this approach path Aa is determined as described below.

For each published approach mode there are available, in a database, elements making it possible to characterize the different segments of this published approach mode (these elements are also printed on the approach maps). On the basis of the said elements, the approach path Aa can be characterized as follows:

the anchoring point P is the point of intersection of the last segment 6 of the published approach mode (that is to say of the arrival path) with the horizontal plane whose altitude corresponds to the predetermined altitude described above;

the angles of orientation α and of slope β of this approach path Aa are those which characterize the said last segment 6 of the published approach mode, such that the said last segment 6 is merged with a part of the approach path Aa.

Figure 4:
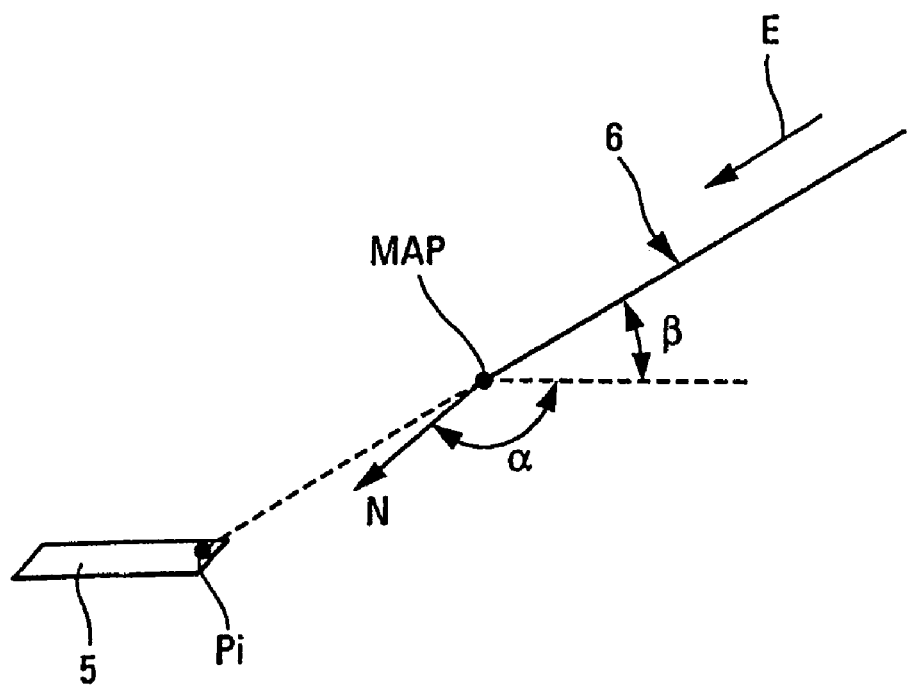
FIGS. 4 to 8 illustrate different applications of the present invention.

Furthermore, when the vertical projection on the ground of the point MAP corresponding to the approach mode selected by the pilot is located upstream of the runway threshold S with respect to the direction of approach E of the aircraft, this approach path Aa is determined as described below (FIG. 4):

the last segment 6 of the arrival path is considered, whose characteristics are published and included in a database of the aircraft in the same way as in the preceding case. This last segment 6 generally ends at the point MAP. This point is therefore located at a positive non-zero altitude with respect to the altitude of the runway 5. The angles of orientation α and of slope β of the approach path Aa are chosen to be the same as those which characterize the said last segment 6;

this last segment 6 is extended as a straight line towards the ground and its point of intersection Pi with the horizontal plane, whose altitude corresponds to the said predetermined altitude, is determined. The anchoring point P of the approach path Aa is chosen to be merged with the said point of intersection Pi.

The approach path Aa determined according to the invention therefore corresponds, in this case, to a half line ending at the point Pi, whose orientation and slope are defined by the angles α and β. The characteristics of the said last segment 6 are such that the point of intersection Pi is generally located above the runway threshold S.

A second situation is now considered in which the center line Ap of the runway 5 is not aligned with the projection on the ground of the last segment 6 of the arrival path.

Figure 5:
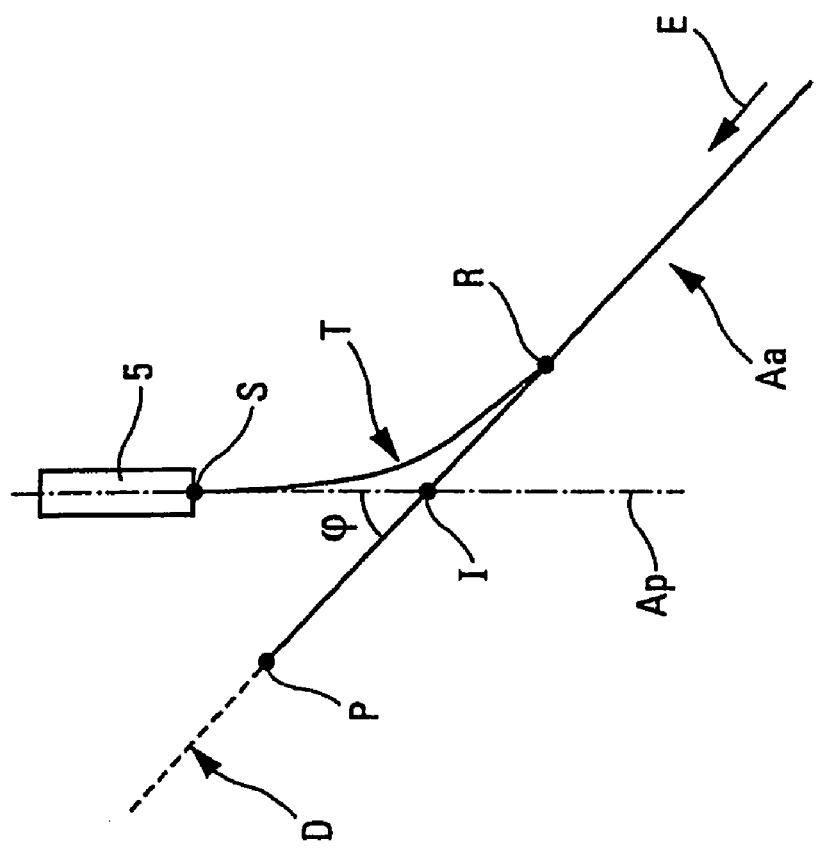

FIG. 5 shows, in plan view, an example of an approach of an aircraft onto a runway 5 in the case where the center line Ap of the runway and the projection on the ground of the last segment 6 of the arrival path relating to the selected approach mode are not aligned. The straight line D shown in this FIG. 5 is a straight line in a horizontal plane of which a part is merged with the vertical projection on the said horizontal plane of the said last segment 6. The altitude of this horizontal plane is preferably chosen as being equal to the said predetermined altitude as previously defined. However, without departing from the scope of the present invention, it is also possible to reason in terms of vertical projection on a horizontal plane corresponding to another altitude, for example the altitude of the runway threshold S. The point I corresponds to the intersection of the said straight line D with the vertical projection on this horizontal plane of the center line Ap of the runway. The point S corresponds to the point of the center line Ap of the runway located on the runway threshold. The point R can be defined as the point from which the pilot is considered to initiate (in manual piloting) a rotation of the aircraft separating it from its theoretical position on the approach path Aa and following a path T in order to progressively join a vertical plane containing the center line Ap of the runway 5 and to place the aircraft on the said runway 5 substantially at the said point S. The point R and the path T can, for example, be determined by an FMS flight management system of the aircraft which generally comprises functions allowing him to calculate a theoretical path of transition between two consecutive segments of a flight plan.

The angles of orientation α and of slope β of the approach path Aa are chosen to be those which characterize the said last segment 6.

Furthermore, the anchoring point P of the approach path Aa is chosen such that, on the one hand, the vertical projection of this path Aa on the said horizontal plane is merged with a part of the straight line D (the path Aa is therefore in the same vertical plane as the said last segment 6) and, on the other hand, the distance between the point R and the anchoring point P along the approach path Aa is substantially equal to the distance between the point R and the vertical projection of the point S on the path T, along this path T (considered in three-dimensional space).

Without departing from the context of the present invention, it is also possible to determine the anchoring point P by reasoning with vertical projections on the said horizontal plane: the anchoring point P is then chosen such that the distance between this anchoring point P and the vertical projection of the point R on this horizontal plane is substantially equal to the distance between the said vertical projection of the point R on this horizontal plane and the vertical projection of the point S on this horizontal plane, along the vertical projection of the path T on this horizontal plane.

This way of determining the approach path Aa is advantageous in that the last segment 6 is substantially merged with a part of this path Aa, which makes it possible to retain the same slope β on the path T as that of the approach path Aa, even for high values of the angle φ between the straight line D and the center line Ap of the runway. There are published approaches for which the value of this angle φ can be as high as 90° or 100°.

Advantageously, the radius of curvature Rc of the path T, calculated for example by the FMS system, depends on the speed of the aircraft. This radius of curvature Rc can, in particular, be calculated according to the following formula:

$$Rc = Vs(Vs/\tan(R_{max}) \cdot g)$$

wherein:

Vs is the approach speed subjected to the wind conditions (Ground Speed);

tan is the tangent;

$R_{max}$ is the maximum roll angle in this phase, generally 30°; and g is the acceleration of gravity.

In a simplified embodiment of the invention, an anchoring point P is chosen such that the distance from the point R to the said anchoring point P is substantially equal to the distance, in a straight line, from the point R to the point S.

Furthermore, in a preferred embodiment of the invention, regarding the considered case (runway center line Ap not aligned with the projection on the ground of the last segment 6), the point P is determined by making an approximation in excess of the said distance between the point R and this point P, as described hereafter.

Figure 6:
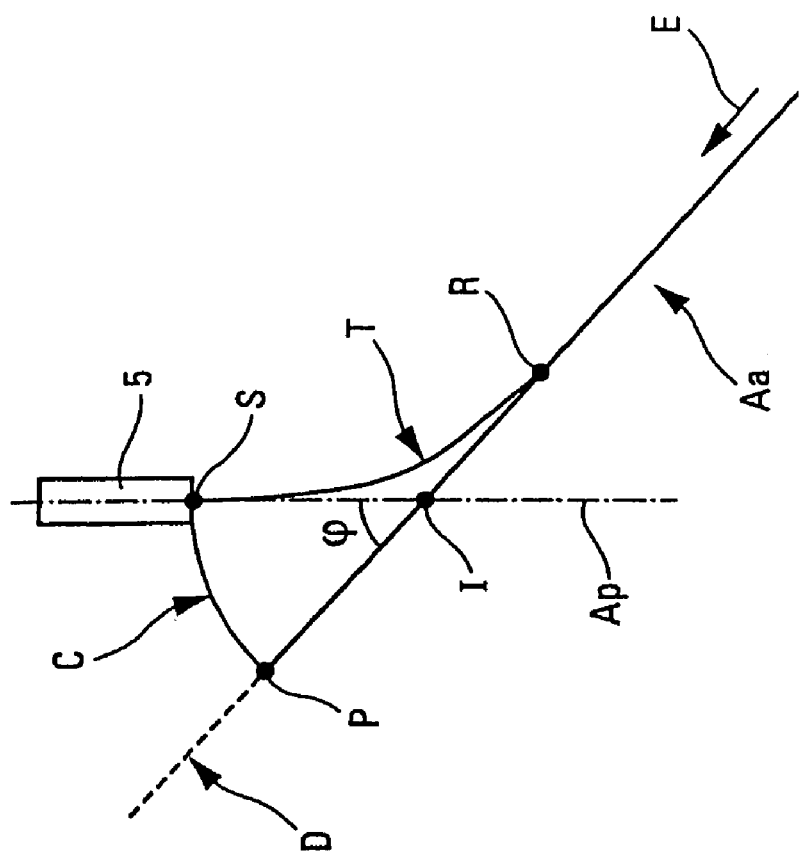

FIG. 6 shows, in plan view, an example of an approach of an aircraft toward a runway 5, similar to the approach example shown in FIG. 5. The point I corresponds to the intersection of the straight line D with the vertical projection on the said horizontal plane of the runway center line Ap. In this horizontal plane there is considered a circle, of center 1, passing through the vertical projection of the point S on the said horizontal plane, of which an arc of circle C is shown in FIG. 6. The anchoring point P of the approach path Aa is that of the points of intersection of this circle and the straight line D which is located downstream of the point I, on this straight line D, with respect to the direction of approach E of the aircraft.

Reasoning in the said horizontal plane, it is observed that the distance between the point P and the vertical projection of the point R on that horizontal plane is equal to the sum, on the one hand, of the distance between the point I and the vertical projection of the point R on that horizontal plane and, on the other hand, of the distance between the point I and the vertical projection of the point S on that horizontal plane (since the distance between the point I and the point P is equal to the distance between the point I and the vertical projection of the point S on that horizontal plane, the point P and the vertical projection of the point S on that horizontal plane being on the same circle of center I). The sum of the said distances is slightly greater than the distance of the point R from the point S along the vertical projection of the path T on the said horizontal plane, whilst being a good approximation of this latter distance. This results in the approach path Aa corresponding to this preferred embodiment being located in the same vertical plane as the path Aa defined for the example shown in FIG. 5 and slightly above the latter. This does not present a problem since the altitude safety margins of the aircraft with respect to the relief are complied with, given that a part of the path Aa for the example shown in FIG. 5 is substantially merged with the last segment 6 of the selected published approach mode.

This preferred embodiment of the invention has the advantage of allowing a very simple determination of the point P.

In another embodiment of the invention corresponding to the considered case (runway center line Ap not aligned with the projection on the ground of the last segment 6), if a final point FEP (Final End Point) is defined for the published approach mode selected by the pilot, this FEP point is chosen as the anchoring point P of the approach path Aa.

Figure 7:
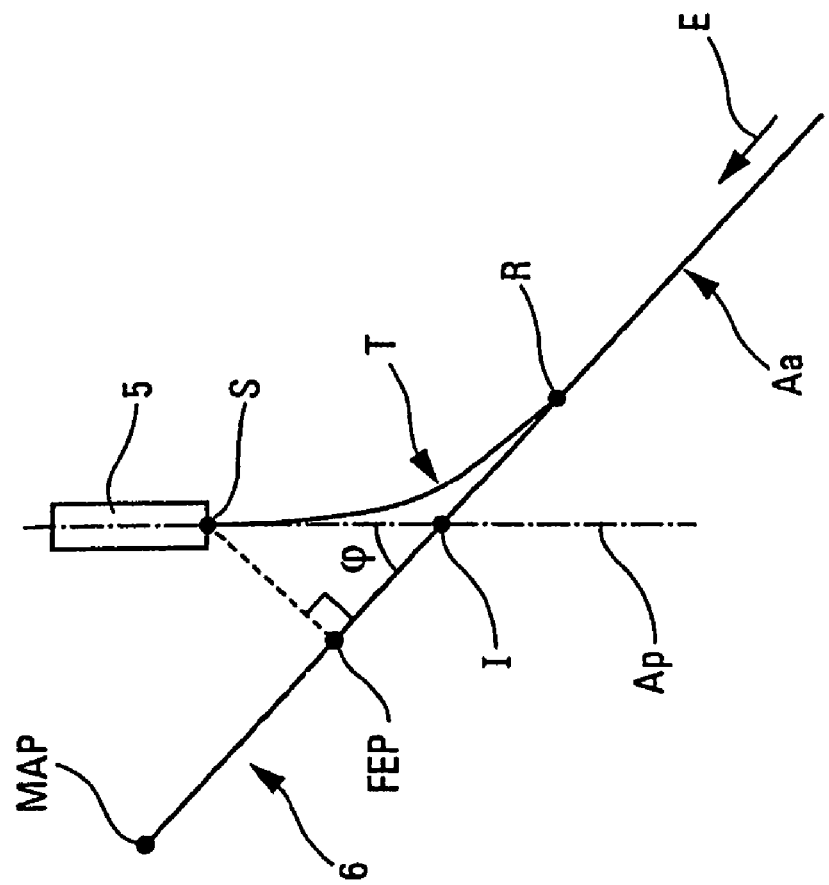

It is known that the FEP point is defined by the standard: "ARINC 424", issue 15. The vertical projection of this FEP point on a horizontal plane containing the point S corresponds to the orthogonal projection of the point S on the projection of the last segment 6 of the selected published approach mode on the said horizontal plane containing the point S (FIG. 7). For a published approach, an FEP point is validly defined only if the vertical projection of the MAP point on the said horizontal plane is located downstream of this FEP point (in the direction of approach E of the aircraft) on a straight line D, part of which is merged with the projection of the said last segment 6.

This embodiment is advantageous in that it allows a very simple determination of the point P (no calculation is necessary since the coordinates of the FEP point are published and coded in a database of the aircraft when this point exists).

It will be noted that the published coordinates of the FEP point comprise its latitude and its longitude and also its altitude. It is not therefore necessary to define the latitude of the point P as envisaged previously. However, in a variant of this embodiment, it is possible also to choose a point P whose latitude and longitude correspond to those of the FEP point but whose altitude is defined as indicated previously.

A third situation is now considered in which the runway center line Ap is parallel with the projection on the ground of the last segment 6 of the selected approach mode and is separate from this projection on the ground of the said last segment 6.

Figure 8:
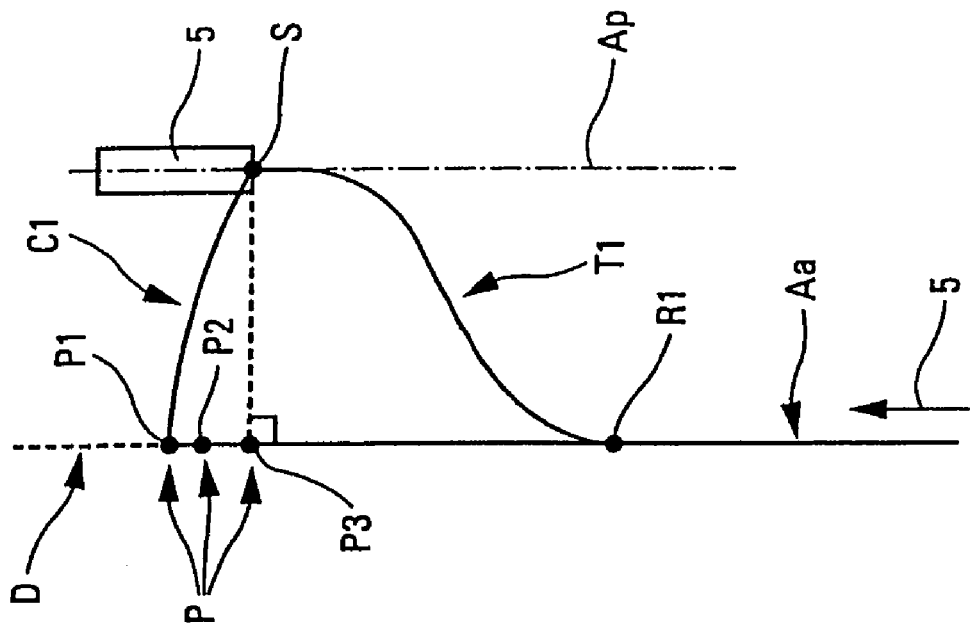

In this third situation, there is no point of intersection between a straight line D and the vertical projection of the runway center line Ap in the horizontal plane containing this straight line D (FIG. 8).

In the same way as for the preceding point R, there is defined, in a particular embodiment, a point R1 and a theoretical path T1 followed by the aircraft in order to reach the runway 5 from the last segment 6. Unlike the preceding case, this path T1 must include at least two zones of curvature with separate centers. In a similar way, the approach path Aa is therefore defined in the same vertical plane as the last segment 6, with the same angles of orientation α and of slope β as the latter and the anchoring point P of this path Aa is chosen to be merged with a point P2 which is such that the distance between the point R1 and this point P2 is substantially equal to the distance from the point R1 to the vertical projection of the point S on the path T1, along this path T1.

Furthermore, in a preferred embodiment, a circle of center R1 is considered in the horizontal plane whose altitude corresponds to the said predetermined altitude. This circle, an arc of which C1 is shown in FIG. 8, passes through the vertical projection of the point S on this horizontal plane. The anchoring point P of the path Aa is then chosen to be merged with a point P1, which is that one of the points of intersection of this circle and the straight line D which is located downstream of the point R1, on this straight line D, with respect to the direction of approach E of the aircraft.

Furthermore, in another embodiment of the invention, the anchoring point P of the final approach Aa is chosen to be merged with a point P3 corresponding to the orthogonal projection, on the horizontal plane having the same altitude as the said predetermined altitude, of the point corresponding to the vertical projection of the point S on this horizontal plane.

In the above description, in order to determine the approach path Aa, there has been taken into consideration the last segment 6 of the arrival path corresponding to the selected published approach mode. In a variant embodiment of the invention, rather than the said last segment 6, the segment of this arrival path which passes through the altitude MDA during descent is taken into consideration. The method of determination of the path Aa described in the preceding embodiments is then used taking into account the segment thus determined rather than the said last segment 6.

This variant embodiment has the advantage of allowing the pilot to have a stabilized path as soon as he passes though the altitude MDA during the descent, that is to say he no longer needs to follow turning paths in order to join consecutive approach segments but he only has to make a final turn in order to align the aircraft with the runway 5 by sight.

The invention claimed is:

1. A method for determining a final approach path of an aircraft for a non-precision approach, for the purpose of landing the aircraft on a runway, said method comprising:

(a) determining an approach mode selected by the pilot of the aircraft from among a plurality of predetermined approach modes;

(b) selecting a characteristic segment of an arrival path which relates to the selected approach mode thus determined;

(c) determining the orientation of the projection on the ground of said characteristic segment with respect to the center line of said runway; and (d) depending on said orientation, determining (i) an anchoring point of the said final approach path, (ii) orientation in a horizontal plane of said final approach path; and (iii) the slope of said final approach path.

2. The method as claimed in claim 1, wherein step (d) comprises determining, as said orientation in said horizontal plane of said final approach path, the orientation of said characteristic segment and determining, as the slope of said final approach path, the slope of said characteristic segment.

3. The method as claimed in claim 1, wherein, when the projection on the ground of the said characteristic segment is aligned with the center line of the runway, the following operations are carried out in step (d): (i) determining a characteristic point corresponding to the limit point at which the pilot must overshoot when the approach is aborted; (ii) determining the relative position between the projection on the ground of said characteristic point and the threshold of the runway; and (iii) determining said anchoring point of said final approach path according to said relative position.

4. The method as claimed in claim 3, wherein, when the projection on the ground of the characteristic point is located on or downstream of the threshold of the runway with respect to the direction of approach (E) of the aircraft, step (d) comprises determining, as said anchoring point of said final approach path, the point of intersection between said characteristic segment and a horizontal plane located at a predetermined altitude.

5. The method as claimed in claim 4, wherein said predetermined altitude corresponds to the altitude of the threshold of the runway.

6. The method as claimed in claim 4, wherein said predetermined altitude corresponds to the altitude of the threshold of the runway), increased by a predetermined value.

7. The method as claimed in claim 4, wherein said predetermined altitude corresponds to the altitude of the ground at the location of the said anchoring point (P).

8. The method as claimed in claim 3 wherein, when the projection on the ground of the characteristic point is located upstream of the threshold of the runway with respect to the direction of approach of the aircraft, step (d) comprises determining, as said anchoring point of said final approach path, the point of intersection of the extension toward the ground of said characteristic segment and a horizontal plane located at a predetermined altitude.

9. The method as claimed in claim 1, wherein, when the projection on the ground of said characteristic segment is not aligned with the center line of the runway, step (d) comprises determining said anchoring point of said final approach path by:

determining a reference point from which the pilot is considered to initiate a rotation of the aircraft in order to join a vertical plane containing the center line of the runway, according to a reference path;

determining said reference path;

determining a horizontal straight line which is located in a horizontal plane which is at a predetermined altitude and which is partially merged with the vertical projection on said horizontal plane of said characteristic segment; and determining, as said anchoring point, the point which is such that, on the one hand, the vertical projection of the final approach path on said horizontal plane is partially merged with said horizontal straight line, and on the other hand, the distance between said point and the reference point along the final approach path is substantially equal to the distance between said reference point and the threshold of the runway along said reference path.

10. The method as claimed in claim 1, wherein, when the projection on the ground of said characteristic segment is not aligned with the center line of the runway, step (d) comprises determining said anchoring point of said final approach path by:

determining a reference point from which the pilot is considered to initiate a rotation of the aircraft in order to join a vertical plane containing the center line of the runway, according to a reference path;

determining said reference path; and determining, as said anchoring point, the point which is such that the distance between the latter and the vertical projection of said reference point on a horizontal plane located at a predetermined altitude is substantially equal to the distance between the vertical projections on said horizontal plane of said reference point and of the threshold of the runway, along the vertical projection of said reference path on the said horizontal plane.

11. The method as claimed in claim 1, wherein, when the projection on the ground of said characteristic segment is not aligned with the center line of the runway, step (d) comprises determining said anchoring point of the said final approach path by:

determining a reference point from which the pilot is considered to initiate a rotation of the aircraft in order to join a vertical plane containing the center line of the runway, according to a reference paths; and determining, as said anchoring point, the point which is such that the distance between the latter and said reference point is substantially equal to the distance between said reference point and the threshold of the runway.

12. The method as claimed in claim 1, wherein, when the projection on the ground of said characteristic segment is not aligned with the center line of the runway, step (d) comprises determining said anchoring point of said final approach path by:

determining a horizontal straight line which is located in a horizontal plane which is at a predetermined altitude and which is partially merged with the vertical projection on said horizontal plane of said characteristic segment;

determining an intermediate point which corresponds to the intersection between said horizontal straight line and the vertical projection on said horizontal plane of the center line of the runway; determining a circle having said intermediate point as its center and the distance between said intermediate point and the vertical projection on said horizontal plane of the threshold of the runway as its radius; and determining, as said anchoring point, the intersection between said circle and said horizontal straight line.

13. The method as claimed in claim 1, wherein, when the projection on the ground of said characteristic segment is not aligned with the center line of the runway, step (d) comprises using, as said anchoring point of said final approach path, a predetermined final point, which is characteristic of said approach mode selected by the pilot of the aircraft.

14. The method as claimed in claim 1, wherein, when the projection on the ground of said characteristic segment is not aligned with the center line of the runway, step (d) comprises determining said anchoring point of said final approach path by:
- determining a predetermined final point, which is characteristic of said approach mode selected by the pilot; and
- determining, as said anchoring point, the point having, as longitude and latitude, the longitude and latitude of said final point, and as altitude, a predetermined altitude.

15. The method as claimed in claim 1, wherein, when the projection on the ground of said characteristic segment is parallel with the center line of the runway, step (d) comprises determining said anchoring point of said final approach path by:
- determining a reference point from which the pilot is considered to initiate a rotation of the aircraft in order to join a vertical plane containing the center line) of the runway, according to a reference path;
- determining said reference path; and
- determining, as said anchoring point, the point which is such that the distance between the latter and said reference point is substantially equal to the distance, along said reference path, between said reference point and the vertical projection of the threshold of the runway on said reference path.

16. The method as claimed in claim 1, wherein, when the projection on the ground of said characteristic segment is parallel with the center line of the runway, step (d) comprises determining said anchoring point of said final approach path by:
- determining a reference point from which the pilot is considered to initiate a rotation of the aircraft in order to join a vertical plane containing the center line of the runway, according to a reference path;
- determining a horizontal straight line which is located in a horizontal plane which is at a predetermined altitude and which is partially merged with the vertical projection on said horizontal plane of said characteristic segment;
- determining a circle having said reference point as its center and the distance between said reference point and the vertical projection on said horizontal plane of the threshold of the runway as its radius; and
- determining, as said anchoring point, the point of intersection between said circle and said horizontal straight line.

17. The method as claimed in claim 1, wherein, when the projection on the ground of said characteristic segment is parallel with the center line of the runway, step (d) comprises determining said anchoring point of the said final approach path by:
- determining a horizontal straight line which is located in a horizontal plane which is at a predetermined altitude and which is partially merged with the vertical projection on said horizontal plane of the said characteristic segment;
- determining an intermediate point which corresponds to the vertical projection on said horizontal plane of the threshold of said runway; and
- determining, as said anchoring point, the point corresponding to the orthogonal projection of said intermediate point on said horizontal straight line.

18. The method as claimed in claim 1, wherein said characteristic segment corresponds to the last segment of said arrival path.

19. The method as claimed in claim 1, wherein said characteristic segment corresponds to the segment of said arrival path which passes through an altitude which is characteristic of the approach mode selected by the pilot of the aircraft.

20. A device for determining a final approach path of an aircraft for a non-precision approach, for the purpose of landing the aircraft on a runway, said device comprising means for implementing the method claimed in claim 1.

21. An aircraft comprising a device capable of implementing the method claimed in claim 1.

* * * * *